United States Patent [19]

Yamana

[11] 4,372,177
[45] Feb. 8, 1983

[54] REAR-VIEW MIRROR CONTROL ACTUATOR

[75] Inventor: Toru Yamana, Fujieda, Japan

[73] Assignee: Murakami Kaimeido Co., Ltd., Japan

[21] Appl. No.: 288,301

[22] Filed: Jul. 30, 1981

Related U.S. Application Data

[63] Continuation of Ser. No. 32,643, Apr. 23, 1979, abandoned, which is a continuation of Ser. No. 866,510, Jan. 3, 1978, abandoned, which is a continuation of Ser. No. 730,001, Oct. 6, 1976, abandoned.

[30] Foreign Application Priority Data

May 19, 1976 [JP] Japan ................................. 51-56665

[51] Int. Cl.³ .............................................. F16C 1/10
[52] U.S. Cl. .............................................. 74/501 M
[58] Field of Search ........................................... 74/501
[56] References Cited

U.S. PATENT DOCUMENTS

| | | | |
|---|---|---|---|
| 2,931,245 | 4/1960 | Jacobson | 74/501 R |
| 3,046,840 | 7/1962 | Barcus | 74/501 R |
| 3,096,664 | 7/1963 | Walsh | 74/501 R |
| 3,191,455 | 6/1965 | Fuqua et al. | 74/501 M |
| 3,253,481 | 5/1966 | Warhol | 74/501 M |
| 3,444,754 | 5/1969 | Liedel | 74/501 M |
| 3,473,823 | 10/1969 | Liedel | 74/501 M |
| 3,533,303 | 10/1970 | McIntyre | 74/501 M |
| 3,552,228 | 1/1971 | Shrode | 74/501 M |
| 3,618,420 | 11/1971 | Horwitt et al. | 74/501 M |
| 3,625,085 | 12/1971 | Shrode | 74/501 M |
| 3,712,149 | 1/1973 | Van Noord | 74/501 M |
| 3,719,105 | 3/1973 | Horwitt et al. | 74/501 M |
| 3,800,619 | 4/1974 | McIntyre | 74/501 R |

Primary Examiner—Kenneth Dorner
Attorney, Agent, or Firm—Robert E. Burns; Emmanuel J. Lobato; Bruce L. Adams

[57] ABSTRACT

A remote control device is disclosed for use particularly in controlling the operation of a rear-view mirror mounted exteriorly of an automotive vehicle. The device includes a compression spring to pre-tension a plurality of flexible operating wires contained in sheaths and interconnecting the control device with the rear-view mirror, the spring is interposed between a cylindrical casing having a control element and a supporting joint member supporting the wires, the joint member being movable axially along a guide pin under the influence of the spring, while the control element is universally pivotable but is held stationary in the axial direction. The supporting joint member has three equidistantly spaced guide surfaces having portions for clamping the wire sheaths, said portions corresponding in position to respective apexes of an equilateral triangle defined about the axis of the guide pin.

2 Claims, 11 Drawing Figures

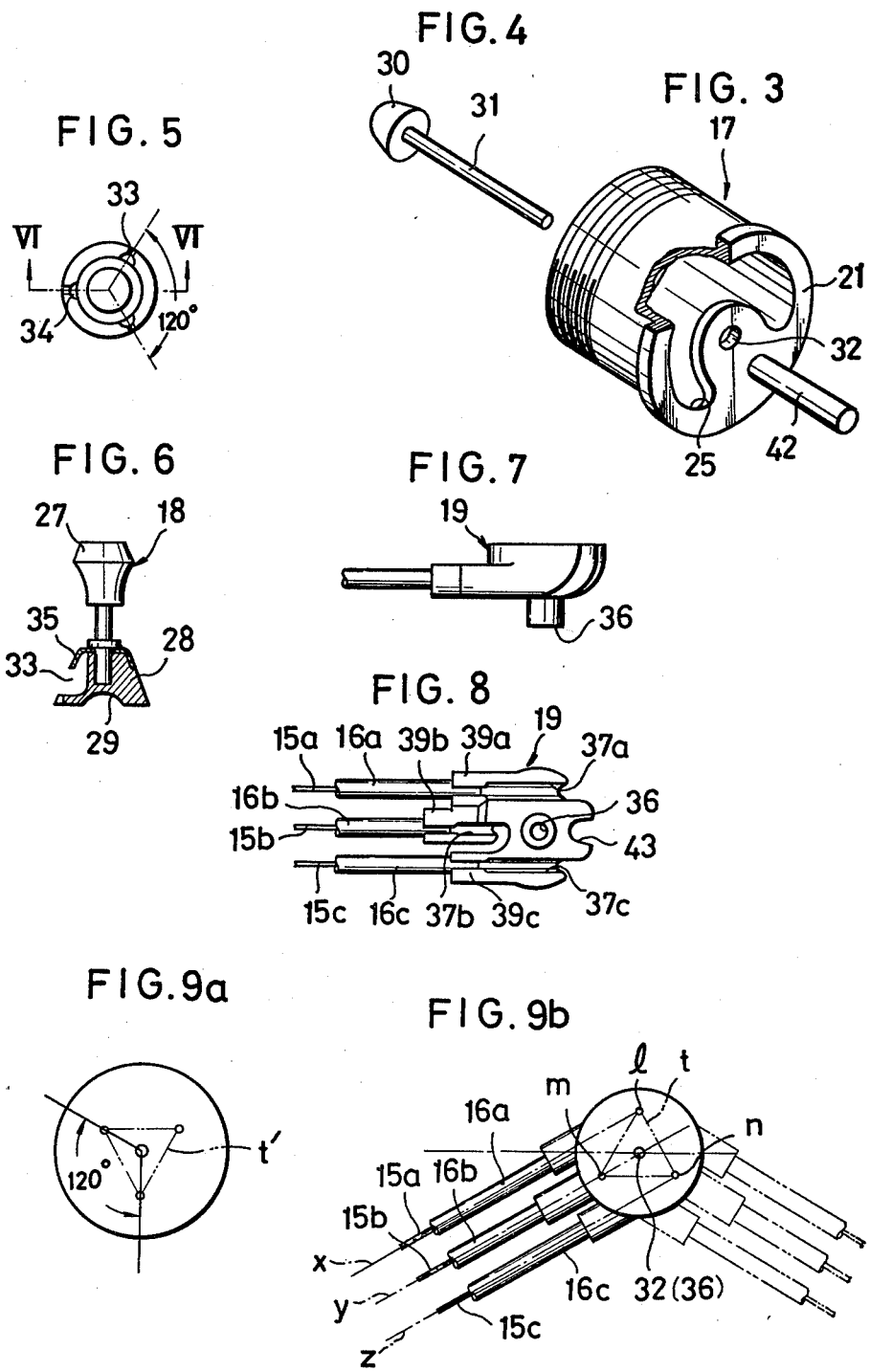

REAR-VIEW MIRROR CONTROL ACTUATOR

This is a continuation of application Ser. No. 032,643, filed Apr. 23, 1979, which is a continuation of Ser. No. 866,510, filed Jan. 3, 1978 which is a continuation of Ser. No. 730,001, filed Oct. 6, 1976, all abandoned.

BACKGROUND OF THE INVENTION

1. Field of the Invention

This invention relates to a three-cable remote control mechanism and particularly to such a mechanism adaptable for controlling from the interior of an automotive vehicle a rear-view mirror mounted outside of the passenger compartment such as on the front fender or door panel of the vehicle.

2. Prior Art

A variety of remote control rear-view assembly forms and constructions have been known for automobile and other similar usages. Particularly, those of the three-cable-operated type are extremely common, which typically comprises a mirror assembly (controlled unit) mounted in some convenient location outside of an automobile, and an actuator assembly (controlling unit) mounted in a convenient position within the driver's compartment and adapted for selectively positioning and retaining in position the mirror assembly, there being provided a plurality of flexible operating cables, usually three in number, with which to interconnect the mirror or controlled assembly with the actuator or controlling assembly, and which is adapted for transmitting controlled movement from the actuator to the mirror to adjust the angle or position of the mirror glass.

Certain typical examples of such a three-cable-operated remote control device are shown for example in U.S. Pat. No. 2,931,245, U.S. Pat. No. 3,096,664 and U.S. Pat. No. 3,552,228. There is one technical aspect that these patents have in common; that is, there is provided resilient means such as a yieldable spring for imposing tension upon the cables to absorb the expansion and contraction thereof which may result from ambient temperature variations, from changes in the distance between the mirror assembly and the remotely located actuator assembly depending upon the type and form of automobiles, or from other dimensioned changes in the cable length during operation. The yieldable spring is disposed between a manually operable lever or handle with which to actuate the cables to adjust the position of the mirror and a bushing at the opposite end of the actuator housing, whereby the spring takes slack or relieves excess tension out of the cables. It readily occurs that response of the mirror to its associated control actuator is higher the greater the tension of the operating cables. However, when imposing tension upon the cables to this end, the spring pulls the actuator lever axially forwardly of the housing, sometimes too far forwardly, with the result that the lever cannot be manipulated for a desired universal pivotal movement due to physical interference by the bezel or nut that secures the actuator assembly to the mounting panel in the automobile interior. Therefore, the yieldable spring as arranged in the above prior art devices often tends to prohibit the free, proper adjustment of the position or reflecting angle of the mirror.

A study of the construction of U.S. Pat. No. 3,552,228 indicates that it has an additional drawback in that due to the arrangement in which the points of connection of the three operating cables at the control actuator must be oriented to be in exactly opposite relationship to those of the cables at the mirror in order to maintain the cojoint pivotal movement of the two units in the same direction, it becomes necessary to sort out individual actuator units for use with mirror units designed for mounting exclusively either at the right-hand side or the left-hand side of the automobile. In other words, if an actuator unit of a right-hand design was used with a mirror unit adapted to be mounted exclusively on the left-hand side of the automobile, then manipulation of the control lever in one or the forward direction would result in the pivotal movement of the mirror in the other or the reverse direction.

SUMMARY OF THE INVENTION

With the foregoing difficulties of the prior art in view, therefore, it is an object of the present invention to provide an improved remote control actuator assembly which is constructed such that an actuator lever or handle is held in universal pivotal position against axial movement relative to the mounting panel.

Another object of the present invention is the provision of an improved remote control actuator assembly which is constructed such that it may be readily adaptable for a remotely controlled mirror assembly irrespective of whether the latter is designed for mounting on the right-hand side or on the left-hand side of an automotive vehicle.

Briefly stated, the actuator assembly according to the invention comprises a plurality of flexible operating wires each encased in sheaths and adapted to interconnect said actuator assembly with a mirror assembly, a cylindrical casing fixedly secured to a mounting panel and having a central bore, a control element disposed for universal pivotal movement within said casing and having a spider member with wire-receiving pockets, a supporting joint member having a plurality of equidistantly spaced guide surfaces for receiving said operating wires, a guide pin coaxial with said control element and extending through said central bore with one of its ends received in a bore formed in said joint member and having a parti-spherical ball at the opposite end for bearing engagement with an open socket formed in said spider member, means adapted for retaining said joint member in position against rotary movement, means for affixing one end of each of sheaths relative to said joint member, and a spring means interposed between said joint member and said cylindrical casing and adapted to tension the operating wires, whereby said joint member is movable axially along said guide pin relative to said cylindrical casing under the influence of said spring means.

The nature of this invention, and the manner in which the foregoing objects are achieved, will become more apparent hereinafter as the description of the invention proceeds with reference to the accompanying drawings.

BRIEF DESCRIPTION OF THE DRAWINGS

FIG. 3 is an enlarged fragmentary perspective view of a component part of the actuator assembly of FIG. 1;

FIG. 4 is a perspective view of a guide pin constituting part of the actuator assembly;

FIG. 5 is a top plan view of an actuator control element included in the actuator assembly;

FIG. 6 is a cross-sectional view taken along the line VI—VI of FIG. 5;

FIG. 7 is a side elevation of a supporting joint member included in the actuator assembly;

FIG. 8 is a plan view of the same as viewed in the direction of the arrows VIII—VIII;

FIG. 9a is a diagrammatic view showing the positions of the respective ends of three operating wires affixed to the rear portion of the mirror;

FIG. 9b shows the positions of the respective wire ends affixed to the control elements.

DETAILED DESCRIPTION OF THE PREFERRED EMBODIMENTS

Figure 1:
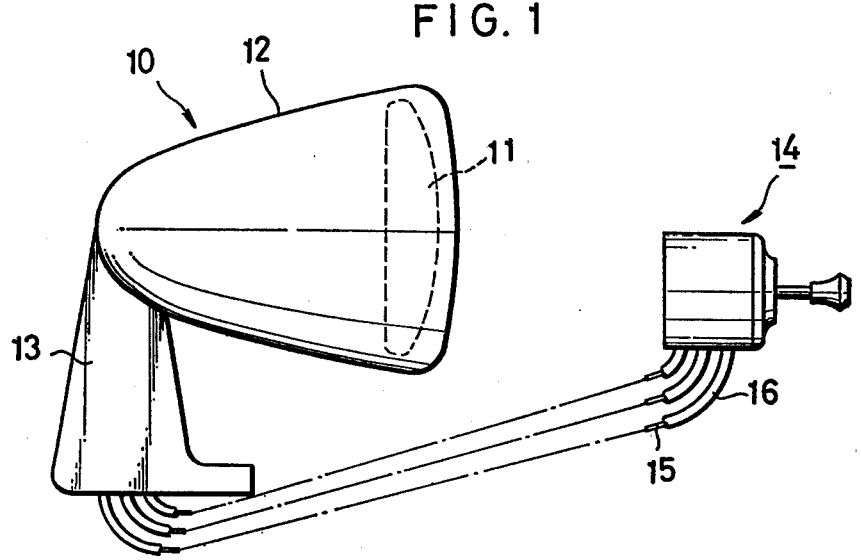
FIG. 1 is a side elevation of a remotely controlled automotive rear-view mirror equipment comprising a mirror and an actuator assembly embodying the invention.

Referring now to the drawings and FIG. 1 in particular, there is shown a remotely controlled mirror assembly generally designated at 10 which includes a mirror glass 11, a mirror housing 12 and a pedestal 13 for supporting the housing 12 upon a suitable part such as the front fender or the door panel of an automotive vehicle. The mirror assembly 10 is adapted to be remotely positioned by means of an actuator assembly 14 located on the vehicle instrument panel, dashboard or other convenient part within the passenger compartment.

The mirror and actuator assemblies are operatively interconnected by a plurality of operating flexible wires or cables 15, usually three in number as shown, which wires or cables are encased in suitable sheathing 16 in manner well known in the art. The mirror assembly 10 is of conventional and well known construction in that it includes means (not shown) for supporting the mirror glass 11 for universal pivotal movement in response to controlled manipulation of an actuator control element within the interior of the automobile. Since the mirror assembly 10 does not form any positive part of this invention, no further description thereof will be required.

Figure 2:
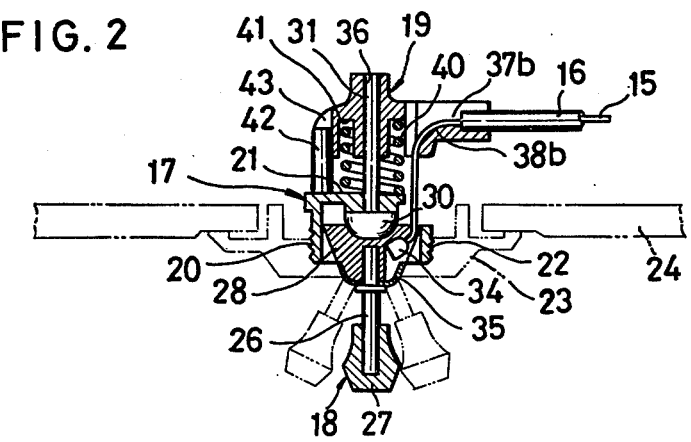
FIG. 2 is an enlarged longitudinal section view taken along the line II—II of FIG. 1.

Now, the actuator assembly 14 to which the principles of the invention are applied, generally comprises, as better shown in FIG. 2, a cylindrical casing 17, a control element 18 and a supporting joint member 19. The cylindrical casing 17 is externally threaded at one of its ends as at 20 and is provided with an end wall 21 at the opposite end. The threads 20 engage with female threads 22 of a bezel 23 secured to a door panel or an instrument panel 24 within the passenger compartment of an automobile. Thus, the cylindrical casing 17 of the actuator assembly 14 is held fixedly in position by the bezel 23 relative to the panel 24. In the end wall 21 of the casing 17, there is formed a substantially U-shaped slot 25 for receiving therethrough the sheathed flexible wires 15, as better shown in FIG. 3.

The control element 18 is comprised of a lever or handle 26 having a knob 27 at one of its ends and a spider 28 of a substantially conical configuration at the opposite end. The spider 28 has an open socket 29 formed centrally thereof for pivotal engagement with a complemental bearing surface or hemi-spherical ball element 30 formed at one or inner end of a guide pin 31 slidably received in a central bore 32 formed in the end wall 21. Alternatively, the guide pin 31 may be fixedly secured to the end wall 21.

As better shown in FIG. 5 and FIG. 6, the spider member 28 has wire-receiving pockets 33 substantially equidistantly or 120° spaced about the axis of the handle 26 for receiving the forward ends of respective wires 15 that are encased in nipples 34. The nipples 34 are seated in the pockets 33 and retained in position against disengagement therefrom by a cap member 35 secured to the handle 26 and extending circumferentially over the pockets 33.

The supporting joint member 19 has a central bore 36 coaxial with the bore 32 in the end wall 21 and adapted to receive the guide pin 31 slidably therethrough. The joint member 19 is provided at one of its ends with generally L-shaped three guide surfaces 37a, 37b and 37c of a channel configuration for guiding the naked wires and having respective sections 38a, 38b and 38c cranked or otherwise curved such that the wires 15a, 15b and 15c are turned therealong through a 90° angle and run substantially parallel with the axis of the pin 31 until their nippled ends 34 are extended in anchored relation to the pockets 33.

Three clamping portions 39a, 39b and 39c are formed integrally with the joint member 19 in communication with the guide surfaces 37a, 37b and 37c respectively and disposed substantially at a right angle to the axis of the guide pin 31 for clamping or otherwise anchoring one terminal ends of respective wire sheaths 16a, 16b and 16c into position relative to the contained wires. Designated at 40 is a compression spring encircling the guide pin 31 and seated at one end in an annular groove 41 formed in the base portion of the joint member 19 and bearing at the other end against the end wall 21 of the cylindrical casing 17. Extending axially from the end wall 21 of the cylindrical casing 17 towards the joint member 19 is a retainer pin 42 adapted to engage in an elongate guide recess 43 formed in the joint member 19 and retain the latter in position against rotation.

According to an important aspect of the invention, the supporting joint member 19 is movable along the guide pin 31 axially towards and away from the cylindrical casing 17 secured movably to the mounting panel 24, so that the influence or tension of the spring 40 applied to the flexible wire 15 is cancelled out solely by reciprocal movement of the supporting joint member 19 without such movement being transmitted to the control element 18.

An additional advantage of the construction of the invention resides in the arrangement in which as above described, the operating wires 15a, 15b and 15c are turned or oriented through a substantially 90° angle at and along the cranked or curved sections 38a, 38b and 38c of the guide surfaces 37a, 37b and 37c which correspond in position to the points of intersection between the axial lines x, y and z of the clamping portions 39a, 39b and 39c of the joint member 19 and the apexes l, m and n of an equilateral triangle t defined about the central bore 32 of the cylindrical casing 17 which is coaxial with the bore 36 of the joint member 19. The equilateral triangle t defined at the supporting joint member 19 has its respective apexes disposed in symmetric, corresponding relation with the positions of the three wire receiving pockets 33 in the control element 18, as can be seen from a comparison of FIG. 9b with FIG. 5.

Thus, the points of turning of the three operating wires 15a, 15b and 15c on the corresponding apexes of the equilateral triangle t at the controlling side (actuator assembly) can be brought into registry with the points of connection of the same wires on the corresponding apexes of a symmetric equilateral triangle t' (FIG. 9a) defined about the center of the mirror glass 11 at the controlled side (mirror assembly), so that one and the same actuator assembly 14 is rendered interchangeable for either a right-hand side or a left-hand side design of mirror assembly 10 simply by shifting the mounting position of the supporting joint member 19.

Figure 10:
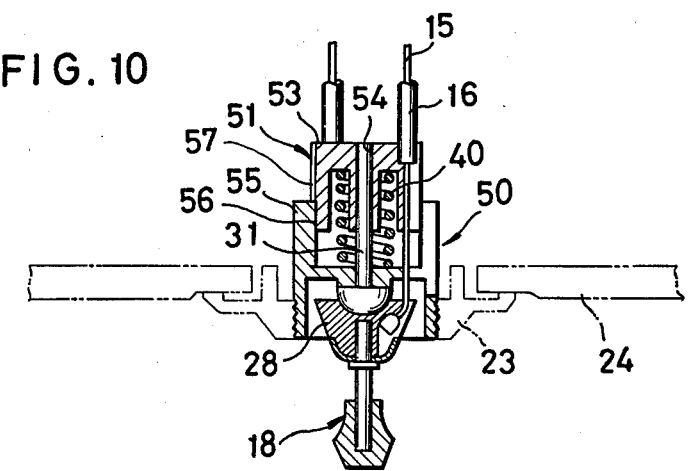
FIG. 10 is a longitudinal section of a modified form of actuator assembly embodying the invention.

There is shown in FIG. 10 a modification of actuator assembly which is essentially identical in the structural details with the actuator assembly 14 which has been herein advanced, except that a support joint member 51 is constructed such that each operating wire 15 is brought through along a substantially straight line of path. The basic structure of this type of actuator assembly is well known in the art, but many of such known devices suffer from a drawback, as previously stated, in that the tension of the spring 40 acts upon and causes the control element 18 to move axially relative to the mounting panel 24. To eliminate this drawback, the actuator assembly 50 shown in FIG. 10 is provided with a supporting joint member 51 having equidistantly spaced bores 52 in the base wall 53 for guidedly receiving three operating sheathed wires 15 each extending straightwardly in parallel with the axis of the guide pin 31, and a control bore 54 for slidably receiving the guide pin 31. A portion of the supporting joint member 51 opposite to the base wall 53 is slidably received within an elongated cylindrical member 55 which is threadedly secured to the bezel 23 in a manner similar to the construction of FIG. 2. The principles of the invention is applied here so that the supporting joint member 51 is arranged to move along the guide pin 31 relative to the stationary cylindrical casing 55 in response to the biasing action of the spring 40.

To prevent rotary movement of the joint member 50, there is provided a longitudinal protuberance 56 formed internally of the casing 55 for engagement with a complemental recessed surface 57 formed externally of the joint member 50.

What is claimed is:

1. A remote control actuator for actuating a remotely controlled device in universal pivotal movement comprising, a casing mounted in use in a fixed position and having a fixed pivot, a control element extending into and out of said casing, a spider fixed to said control element for pivotal universal movement about said fixed pivot under the control of said control element, three flexible wires connected to said spider at three equally angularly spaced points about 120 degrees apart and having end portions connected in use to a remotely controlled device to be controlled in universal pivotal movement, a guide pin fixed to said casing coaxially with said control element and said spider and extending axially away from said spider, a tensioning member for tensioning the three flexible wires jointly and continuously, said tensioning member being disposed circumferentially about said guide pin and axially slidable relative to said guide pin, said tensioning member having thereon three circumferentially spaced L-shaped, lateral projections each having a leg extending in a direction about 90° away from the axis of the guide pin defining respective channels through which respective ones of the wires extend at about 90° to the axis of the guide pin and are bent each along an L-shaped length intermediate the points of connection to the spider and lengths thereof extending outwardly of said casing, said projections underlying the bend of the bent portions and lengths thereof substantially normal to said axis and being disposed substantially aligned with respective points at the spider and axially spaced therefrom, said tensioning member having a guide recess, a retainer pin fixed to said casing and extending substantially parallel to said guide pin into said guide recess for maintaining the tensioning element from rotating about said guide pin, a spring constantly biasing said tensioning element in a direction away from said spider element effective to cause said projections underlying the wires to continuously apply tensioning forces to the respective wires to tension said wires, the three points of connection of said wires to said spider being disposed to correspond to points each at a corresponding vertex of a respective angle of an equilateral triangle having a center coaxial with said control element and said guide pin, and said wires being connectable in use to the controlled device at points each corresponding to a respective vertex of a corresponding angle of an equilateral triangle having a center corresponding to the center of the remotely controlled device and having equilateral sides corresponding to equilateral sides of an equilateral triangle defined by said spaced points of connection of said wires to said spider and equal thereto.

2. In combination, a remote control actuator according to claim 1, and a rear-view mirror for use pivotally mounted on a vehicle remote from said control actuator for pivotal universal movement under control of said wires, and said mirror being a mirror mounted in use on the left hand side or right hand side of said vehicle.

* * * * *